350-6.4 SR CROSS REFERENCE SEARCH ROOM
XR 2,792,448

(1)

X 2630

May 14, 1957 A. F. DEUTH ET AL 2,792,448

FACSIMILE SCANNING APPARATUS

Filed Dec. 18, 1952

INVENTOR.
ALBERT F. DEUTH
GEORGE M. STAMPS
BY Jacob B. Burke
ATTORNEY

2792448
NO OR CLASSIF 2,792,448

FACSIMILE SCANNING APPARATUS

Albert F. Deuth, Hartsdale, and George M. Stamps, New Hyde Park, N. Y., assignors to Faximile, Inc., New York, N. Y., a corporation of Delaware Application December 18, 1952, Serial No. 326,695

10 Claims. (Cl. 178—7.6)

This application relates to facsimile systems and particularly concerns a novel continuous scanner usable therein.

It is an object of the invention to provide a facsimile apparatus including a continuous scanner employing optical systems mounted on an endless belt carrier.

It is a further object to provide a novel optical system for a facsimile scanner.

It is a further object to provide a facsimile transceiver including an endless belt carrying optical elements for scanning and recording styli for direct recording.

It is a further object to provide a facsimile photo-recorder including an endless belt carrying plural optical systems.

A continuous scanner employing an endless belt with optical systems mounted thereon is particularly advantageous for scanning wide copy of the order of one to five feet or more. Such an apparatus makes feasible continuous scanning of such wide copy with a definition of 100 lines per inch or more by extending the length of the belt to any desired size. The optical systems disclosed herein present large entrance pupils to transmitted light. This is a great advantage where the system is used for reflection density scanning. Means are provided for adjusting the positions of the optical elements of the optical systems which improve the precision of the scanning operation. Means are also provided for preventing vibration of the belt and of the optical systems during the scanning operation. The apparatus is adapted for carrying associated recording styli so that it may be used for direct recording as well as for scanning facsimile copy. The apparatus is also adapted for use as a facsimile photo-recorder.

The invention disclosed herein will be best understood by reference to the drawing wherein.

Figures 1, 3, 4, 5:
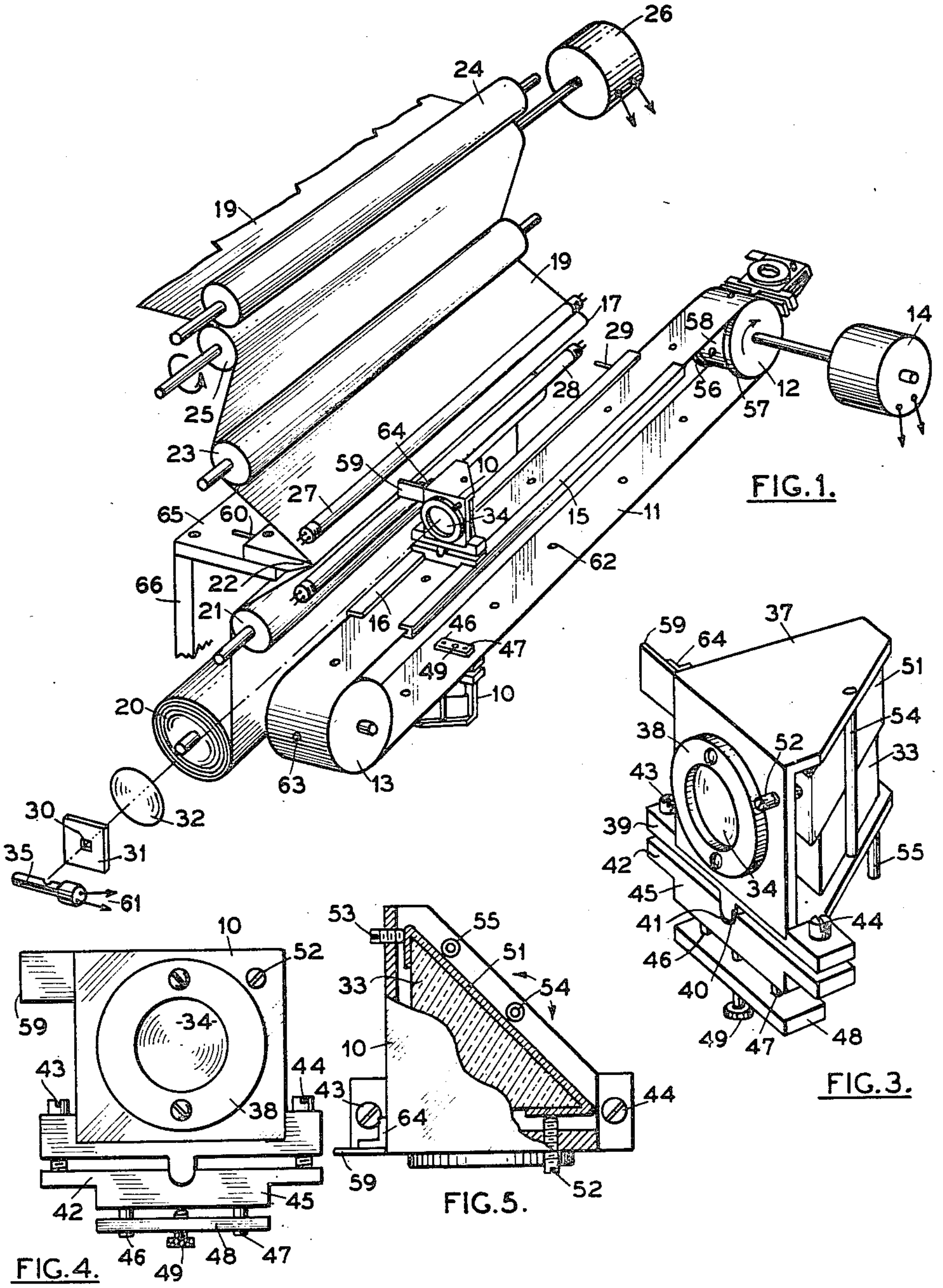
Fig. 1 is a perspective view of a facsimile transceiver including continuous scanning means.
Fig. 3 is a perspective view of an arrangement of optical elements of an optical system usable in the apparatus of Fig. 1.
Fig. 4 is an elevational view of Fig. 3.
Fig. 5 is a partial sectional view of the optical system of Fig. 3.

With reference to Fig. 1, the apparatus employs a plurality of optical systems 10 which may be two or more in number as desired. The systems 10 are mounted on an endless belt 11 engaged on pulleys 12, 13 which may be sprocketed or provided with other non-slip means. In the present embodiment of the invention the belt 11 is provided with equally spaced holes 62 in which fit the projecting pins 63. Pins 63 are attached to pulleys 12, 13 and prevent slippage of belt 11 on the pulleys. The optical systems 10 are spaced equal distances apart on the belt 11. Pulley 12 is driven by an appropriate synchronous motor 14. The belt 11 is engaged at its sides by tracks 15 and 16 so that the movement of the optical systems 10 is smooth and accurate with respect to scanning line 17. Each optical system 10 views a small area 18 on copy 19 which lies on line 17. See Fig. 2. Copy 19 is fed continuously from roll 20 and is fed around idler roller 21, the edge of blade 22, idler rollers 23, 24, and drive roller 25. Blade 22 is supported by frame members 65, 66. The edge of blade 22 may be slightly flattened or may have a curvature of short radius. A wide flat or curved stationary surface may be provided instead of the narrow edge of blade 22 if desired or the copy 19 could be passed over an idler roller to provide a base surface for scanning line 17. Roller 25 is driven by a motor 26. The speeds of motors 26 and 14 are adjusted so that the movement of copy 19 is coordinated with that of belt 11. If desired a single motor may be used and suitable gearing may be employed to drive belt 11 and copy 19 in coordination with each other. The scanned area 18 on line 17 is illuminated by lamps 27, 28 which are line light sources. Lamps 27, 28 are supplied with current in any conventional manner. Suitable reflectors not shown may be used with the lamps 27, 28. A plurality of aligned spot lamps may be employed instead of the elongated lamps 27, 28. If desired a small spot lamp may be mounted on each traveling optical system 10 to illuminate the scanned area 18. Current may be supplied through conductor 29 and track 16 to the moving spot lamps.

Figure 2:
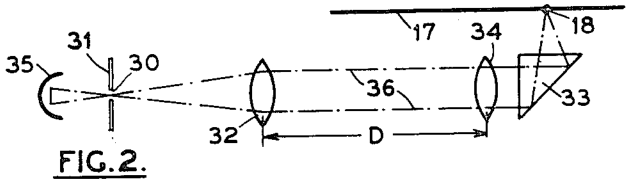
Fig. 2 is a diagrammatic representation of the basic optical system of Fig. 1.

The optical system as shown in Figs. 1 and 2 employs an aperture 30 in plate 31. Lens 32 focuses aperture 31 on copy 19. Light from the scanned area 18 passes through prism 33, lenses 34 and 32, and aperture 30 to the light translator such as photoelectric cell or photomultiplier tube 35 which responds to the density of light transmitted from scanned copy 19. Right angle prism 33 which is employed as a mirror could be a suitably disposed flat mirror instead. It directs light parallel to the direction of scanning. The lens 34 is focused to the scanned area 18 so that a substantially parallel light beam 36 results. Any desired shape of aperture 30 may be employed. If a circular image is desired on phototube 35 the apertured plate 31 may be omitted. Another angularly disposed mirror or prism may be employed between phototube 35 and lens 34 to direct the beam 36 at right angles to the direction of scanning and shorten the length of the apparatus shown in Fig. 1.

Optical system 10 as shown in Figs. 3, 4, and 5 comprises a shell 37 having an aperture at one side in which is mounted lens frame 38 and lens 34. Shell 37 is provided with a base 39 having a centrally disposed rounded projection 40 at the bottom thereof. Projection 40 rests in a groove 41 in auxiliary base member 42. Screws 43, 44 pass through base members 39 and 42 and permit adjustment of shell 37 on a horizontal axis. Base member 42 has a base block portion 45 which rests on the belt 11. A pair of dowel pins 46 pass through apertures in belt 11 and are lodged in strap member 48. Strap 48 is provided with an aperture through which screw 49 passes to be threaded in base block 45 to hold the optical system 10 securely on belt 11. Pulleys 12, 13 are each provided with flanged portions 56, 57 and a central channel 58 in which strap 48 fits as the optical system travels around each pulley. Shell 37 contains prism 33 held by retaining strip 51. Two screws 52, 53 are threaded in shell 37 and serve to adjust the position of prism 33 around a vertical axis through the pin 54. Pin 54 is centrally disposed at the rear of the prism 33. A pin 55 is provided in the bottom of shell 31 and serves as a leg for the optical system 10 to provide stability as the belt travels. When the belt 11 bends around pulleys 12, 13 the end of pin 55 leaves the belt, but when the belt straightens out again, the end of pin 55 comes back to rest on belt 11 and damps out vibrations set up in the optical system assembly during the turn.

It will be noted that screws 43, 44 and 52, 53 permit adjustment of the prism mirror 33 about two mutually orthogonal axes. Adjustment of screws 43, 44, rotates the prism mirror about a horizontal axis disposed parallel to belt 11 which is equivalent to raising or lowering the scanning area 18 on copy 19. The displacement of lens 34 in this motion is lateral to the optic axis along belt 11. Since the light rays 36 are substantially parallel, a lateral displacement of the parallel rays does not alter the position at which the lens 32 brings them into focus. Thus adjustment screws 43, 44 permit only up and down adjustment of the scanned area 18. The adjusting screws 52, 53 permit rotation of the prism mirror 33 about a vertical axis perpendicular to belt 11. In such a rotation the lens 34 is not displaced, so that the optic axis is undisturbed. However, the scanning spot on the copy is displaced forward or backward by this motion.

Alignment of the overall optical system of the plural optical assemblies 10 is achieved by observation of the image of scanned area 18 appearing in aperture 30 from any optical system 10. The belt is then rotated a suitable amount, 120 degrees for a three optical system arrangement, to bring the next optical system 10 into the same position. The image from this system is also observed at aperture 30 and the screws 43, 44, 52, 53 are adjusted until the same image appears as was obtained with the first optical assembly 10. The same procedure is followed for adjusting successive optical assemblies.

The basic optical system employed in this apparatus for scanning copy relies upon the lens 34 which is located with respect to prism mirror 33 so that scanned area 18 is located in the principal focal plane of lens 34 and light rays from area 18 are rendered substantially parallel by lens 34. Lens 32 is located a distance D from lens 34 so that an image is formed in the principal focal plane of lens 32. The magnification of area 18 may be stated as $F_2/F_1$ where $F_2$ and $F_1$ are the focal lengths of lenses 32 and 34 respectively. The magnification is independent of distance D so that lens 34 and scanned area 18 may move while the image of area 18 at aperture 30 will remain stationary. Aperture 30 is located in the focal plane of lens 32. Substantially all light which is transmitted from area 18 and which reaches lens 34 also reaches lens 32 and the intensity of the image at aperture 30 remains constant. Lens 34 acts as the entrance pupil. The size of the exit pupil at lens 34 depends on the distance D. However, since area 18 is an elemental scanned area the increase of the exit pupil at lens 32 is small and for a distance D of the order of one to five feet the relative sizes of pupil are substantially the same so that the light rays 36 may be regarded as well collimated. When aperture 30 is exactly at the focal point of lens 32, and when distance D is small, i. e., lens 34 is close to lens 32, an image of area 18 will be in focus at aperture 30 only when area 18 is in the focal plane of lens 34. This simultaneously determines the position of scanning line 17 on copy 19 and fulfills the collimation principle upon which the present scanning technique depends.

The apparatus is also provided with means for direct recording of facsimile messages. A stylus or electrode 59 is mounted by a bracket 64 on each optical assembly 10 and makes contact with scanning line 17 during the travel of belt 11. If desired the styli or electrodes 59 may be mounted on the belt 11 separate from the optical assemblies 10 in suitable holders or by any other desired means. The electrodes may have elongated edges or may be pointed styli as desired. Recording voltage may be applied to conductors 29 and 60. The current will pass through electrode 59 and recording medium 19 to mark the medium 19 electrically in a manner well known in the art. The recording medium may be any type of moist or dry electrical or electrolytic recording sheet.

Since the apparatus includes copy scanning as well as copy recording features it constitutes a facsimile transceiver apparatus. In use as a transceiver the apparatus will record directly or transmit scanned copy depending upon the electrical connections made to conductors 29, 60, and the conductors 61 of phototube 35. It is possible to employ the disclosed apparatus as a photo-recorder by employing as a light translator a lamp in place of phototube 35 and impressing facsimile signals on the lamp to modulate the light output of the lamp. Copy 19 would in such case be a photosensitive recording medium so that when belt 11 is operated in coordination with the copy holding rollers the optical system 10 will cause modulated light to fall upon copy 19 to record photocopy.

The principal embodiment of the invention herein disclosed and the several described modifications thereof are presented solely by way of illustration rather than limitation.

The invention is to be limited only by the scope of the claims.

What is claimed is:

1. A facsimile apparatus, comprising a continuously movable endless belt, a plurality of optical systems, said systems being mounted on supports disposed in equally spaced positions on the belt for movement in an endless path, said path having a fixed straight section of predetermined length, means for supporting a copy sheet so that one transverse scanned line thereon is disposed in a plane adjacent to and parallel to said straight section, each of said optical systems including a mirror element and a first lens, said mirror element having a reflecting surface disposed at an angle to said line and arranged to reflect light from said line on the copy sheet into an optical path having a fixed portion disposed parallel to said straight section, said lens having its optical axis disposed parallel to said fixed portion of the optical path, said lens being spaced from the mirror element and focused on said line so that the focal point of the lens travels along the line as the belt is moved; a second lens mounted in a stationary position and having its optical axis disposed in alignment with the optical axis of the first lens at all positions of the lens along said straight section, said second lens being located to receive only substantially parallel light rays from the first lens of each of said optical systems in turn, and a single photocell disposed in a fixed position in said optical path and arranged to receive images of constant size from each of said optical systems through said second lens, said supports being arranged for adjustably positioning the first lens of each of said optical systems with respect to its associated mirror element and for adjustably positioning each of the optical systems on the belt.

2. A facsimile apparatus according to claim 1, wherein each of said supports comprises a shell, pivotally mounted on a base member secured to said belt.

3. A facsimile apparatus, comprising a continuously movable endless belt, a plurality of optical systems mounted in equally spaced positions on the belt for movement in an endless path, said path having a fixed straight section of predetermined length, means for supporting a copy sheet so that one transverse scanned line thereon is disposed in a plane adjacent to and parallel to said straight section, each of said optical systems including a mirror element and a first lens, said mirror element having a reflecting surface disposed at an angle to said line and arranged to reflect light from said line on the copy sheet into an optical path having a fixed portion disposed parallel to said straight section, said lens having its optical axis disposed parallel to said fixed portion of the optical path, said lens being spaced from the mirror element and focused on said line so that the focal point of the lens travels along the line as the belt is moved; a second lens mounted in a stationary position and having its optical axis disposed in alignment with the optical axis of the first lens at all positions of the lens along said straight section, said second lens being located to receive only substantially parallel light rays from the first lens of each of said optical systems in turn, and a single phototube disposed in a fixed position in said optical path and arranged to receive images of constant size from each of said optical systems through said second lens.

4. A facsimile apparatus, comprising a continuously movable endless belt, a plurality of optical systems mounted in equally spaced positions on the belt for movement in an endless path, said path having a fixed straight section of predetermined length, means for supporting a copy sheet so that one transverse scanned line thereon is disposed in a plane adjacent to and parallel to said straight section, each of said optical systems including a mirror element and a first lens, said mirror element having a reflecting surface disposed at an angle to said line and arranged to reflect light from said line on the copy sheet into an optical path having a fixed portion disposed parallel to said straight section, said lens having its optical axis disposed parallel to said fixed portion of the optical path, said lens being spaced from the mirror element and focused on said line so that the focal point of the lens travels along the line as the belt is moved; a second lens mounted in a stationary position and having its optical axis disposed in alignment with the optical axis of the first lens at all positions of the lens along said straight section, said second lens being located to receive only substantially parallel light rays from the first lens of each of said optical systems in turn, a single phototube disposed in a fixed position in said optical path and arranged to receive images of constant size from each of said optical systems through said second lens, and a mask having an aperture located at the focus of said second lens between the phototube and the second lens so that an image of constant size and shape is cast on the phototube in all positions of the optical systems in said straight sections.

5. A facsimile apparatus, comprising a continuously movable endless belt, a plurality of optical systems, said systems being mounted on supports disposed in equally spaced positions on the belt for movement in an endless path, said path having a fixed straight section of predetermined length, means for supporting a copy sheet so that one transverse scanned line thereon is disposed in a plane adjacent to and parallel to said straight section, each of said optical systems including a mirror element and a first lens, said mirror element having a reflecting surface disposed at an angle to said line and arranged to reflect light from said line on the copy sheet into an optical path having a fixed portion disposed parallel to said straight section, said lens having its optical axis disposed parallel to said fixed portion of the optical path, said lens being spaced from the mirror element and focused on said line so that the focal point of the lens travels along the line as the belt is moved; a second lens mounted in a stationary position and having its optical axis disposed in alignment with the optical axis of the fist lens at all positions of the lens along said straight section, said second lens being located to receive only substantially parallel light rays from the first lens of each of said optical systems in turn, and a single photocell disposed in a fixed position in said optical path and arranged to receive images of constant size from each of said optical systems through said second lens, said supports being arranged for adjustably positioning the first lens of each of said optical systems with respect to its associated mirror element and for adjustably positioning each of the optical systems on the belt, each of said supports comprising a shell pivotally mounted on a base member secured to said belt, said mirror element being a right angle prism, and a pair of tracks guiding said belt to prevent vibration of the belt while moving in said fixed straight section of the endless path.

6. A facsimile apparatus, comprising a continuously movable endless belt, a plurality of optical systems mounted in equally spaced positions on the belt for movement in an endless path, said path having a fixed straight section of predetermined length, means for supporting a copy sheet so that one transverse scanned line thereon is disposed in a plane adjacent to and parallel to said straight section, means for moving said copy sheet continuously in one direction perpendicular to said line, each of said optical systems including a mirror element and a first lens, said mirror element having a reflecting surface disposed at an angle to said line and arranged to reflect light between said line on the copy sheet and an optical path having a fixed portion disposed parallel to said straight section, said lens having its optical axis disposed parallel to said fixed portion of the optical path, said lens being spaced from the mirror element and focused on said line so that the focal point of the lens travels along the line as the belt is moved; a second lens mounted in a stationary position and having its optical axis disposed in alignment with the optical axis of the first lens at all positions of the lens along said straight section, said second lens being located so that only substantially parallel light rays pass between the second lens and the first lens of said optical systems in turn, and a single light translator disposed in a fixed position in said optical path beyond said second lens.

7. A facsimile apparatus, comprising a continuously movable endless belt, a plurality of optical systems mounted in equally spaced positions on the belt for movement in an endless path, said path having a fixed straight section of predetermined length, means for supporting a copy sheet so that one transverse scanned line thereon is disposed in a plane adjacent to and parallel to said straight section, means for moving said copy sheet continuously in one direction perpendicular to said line, each of said optical systems including a mirror element and a first lens, said mirror element having a reflecting surface disposed at an angle to said line and arranged to reflect light between said line on the copy sheet and an optical path having a fixed portion disposed parallel to said straight section, said lens having its optical axis disposed parallel to said fixed portion of the optical path, said lens being spaced from the mirror element and focused on said line so that the focal point of the lens travels along the line as the belt is moved; a second lens mounted in a stationary position and having its optical axis disposed in alignment with the optical axis of the first lens at all positions of the lens along said straight section, said second lens being located so that only substantially parallel light rays pass between the second lens and the first lens of each of said optical systems in turn, and a single light translator disposed in a fixed position in said optical path beyond said second lens, and a mask having an aperture located at the focus of said second lens, said mask being disposed between said light translator and said second lens.

8. A facsimile apparatus, comprising a continuously movable endless belt, a plurality of optical systems mounted in equally spaced positions on the belt for movement in an endless path, said path having a fixed straight section of predetermined length, means for supporting a copy sheet so that one transverse scanned line thereon is disposed in a plane adjacent to and parallel to said straight section, means for moving said copy sheet continuously in one direction perpendicular to said line, each of said optical systems including a mirror element and a first lens, said mirror element having a reflecting surface disposed at an angle to said line and arranged to reflect light to said line on the copy sheet from an optical path having a fixed portion disposed parallel to said straight section, said lens having its optical axis disposed parallel to said fixed portion of the optical path, said lens being spaced from the mirror element and focused on said line so that the focal point of the lens travels along the line as the belt is moved; a second lens mounted in a stationary position and having its optical axis disposed in alignment with the optical axis of the first lens at all positions of the lens along said straight section, said second lens being located to transmit only substantially parallel light rays to the first lens of each of said optical systems in turn, a single lamp disposed in a fixed position in said optical path and arranged to emit modulated light for transmission by the second lens to said copy sheet, and an opaque member having an aperture located at the focus of said second lens between the lamp and second lens.

9. A facsimile apparatus, comprising a movable endless belt, a plurality of optical systems mounted in spaced positions on the belt for movement in an endless path, said path having a fixed straight section, means for supporting a copy sheet so that one transverse scanned line thereon is disposed adjacent to said straight section, each of said optical systems including a mirror element and a first lens, said mirror element having a reflecting surface disposed at an angle to said line and arranged to reflect light from said line into said lens, said lens being focused on said line, a second lens mounted in a stationary position to receive only substantially parallel light rays from the first lens of each of said optical systems in turn, a single phototube disposed in a fixed position to receive images of constant size from each of said optical systems through said second lens, and a mask having an aperture disposed between the phototube and second lens at the focus thereof.

10. A facsimile apparatus, comprising a moveable endless belt, a plurality of optical systems mounted in spaced positions on the belt for movement in an endless path, said path having a fixed straight section, means for supporting a copy sheet so that one transverse scanned line thereon is disposed adjacent to said straight section, each of the optical systems including a mirror element and a first lens, said mirror element having a reflecting surface disposed at an angle to said line and arranged to reflect light between said line and said lens, said lens being focused on said line, a second lens mounted in a stationary position so that only substantially parallel light rays pass between the second lens and the first lens of each of said optical systems, and a single light translator tube disposed in a fixed position beyond the second lens in an optical path therewith.

References Cited in the file of this patent

UNITED STATES PATENTS

| | | |
|---|---|---|
| 727,948 | Higgins | May 12, 1903 |
| 1,025,074 | Ripley et al. | Apr. 30, 1912 |
| 1,831,924 | Morse | Nov. 17, 1931 |
| 2,129,483 | Van Deventer | Sept. 6, 1938 |
| 2,141,975 | Finch | Dec. 27, 1938 |
| 2,176,680 | Nichols | Oct. 17, 1939 |
| 2,478,555 | Yule | Aug. 9, 1949 |
| 2,670,665 | Caldwell | Mar. 2, 1954 |

FOREIGN PATENTS

| | | |
|---|---|---|
| 288,251 | Great Britain | June 28, 1928 |